Sept. 30, 1969    M. J. HILLMAN    3,469,515
VELOCITY COMPARATOR FOR DEVICES HAVING INTERMITTENT MOTION
Filed Sept. 12, 1966    3 Sheets-Sheet 1

Murray J. Hillman,
INVENTOR.
BY
GOLOVE & KLEINBERG,
ATTORNEYS.

Sept. 30, 1969  M. J. HILLMAN  3,469,515
VELOCITY COMPARATOR FOR DEVICES HAVING INTERMITTENT MOTION
Filed Sept. 12, 1966  3 Sheets-Sheet 2

Murray J. Hillman,
INVENTOR.
BY.

GOLOVE & KLEINBERG,
ATTORNEYS.

United States Patent Office 3,469,515
Patented Sept. 30, 1969

3,469,515
VELOCITY COMPARATOR FOR DEVICES HAVING INTERMITTENT MOTION
Murray J. Hillman, West Covina, Calif., assignor to Hycon Mfg. Company, Monrovia, Calif.
Filed Sept. 12, 1966, Ser. No. 578,642
Int. Cl. G03b 29/00
U.S. Cl. 95—12.5  12 Claims

ABSTRACT OF THE DISCLOSURE

Apparatus is provided for testing image motion compensation devices which include moving elements that operate at different velocity for limited periods of time. A transducer signals the actual velocity during the interval of interest and the velocity signal is compared with a previously calibrated signal representing a desired velocity. An output error signal is sampled during successive intervals corresponding to the intervals of interest, only, and the sampled error signals are accumulated and averaged to provide an output signal corresponding to and representative of the velocity error during the interval of interest.

---

This invention relates to apparatus to detect and signal the deviation of the actual velocity of a moving device from a desired velocity during discrete, predetermined time intervals, and more particularly, to test apparatus that is to operate in conjunction with other apparatus which must function over a critical desired velocity range for a limited time interval and over other velocities during other times.

In certain photographic applications, most notably aerial photography, conditions exist which result in relative movement between the camera and the object which is to be photographed. For example, when photographing the earth's surface from a camera attached to a moving airplane, the image at the focal plane of the camera is continually changing due to the relative movement of the camera and the earth's surface. If provision is not made to compensate for such image motion during the exposure interval of the film, the resultant photograph of the image will be blurred.

Various image motion compensation devices have been employed in combination with aerial cameras, in an attempt to eliminate the relative movement of the image and the film during exposure. For example, the film format may be translated during the exposure interval with a velocity equal to the velocity of the image with respect to the focal plane. Atlernatively, the entire camera may be rotated during the exposure interval to provide image motion compensation. Still other image motion compensation arrangements cause rotation of a mirror, located in the optical path between the camera lens and the object, thereby maintaining the image stationary in the focal plane.

As the term implies, the effect of the image motion compensation devices is to eliminate movement of the image relative to the film emulsion during an exposure interval. Assuming that a vehicle is moving at a constant velocity, the driving force which produces compensation of image motion is a predetermined function of the velocity of the vehicle and its altitude, relative to the object.

The occurrence of this desired driving interval is periodic. In moving mirror image motion compensation systems, for example, a mirror accelerates from rest to a desired rate which is maintained during the film exposure interval, after which the rotation of the mirror stops in a forward direction, reverses its direction and rotates to the starting point for the next cycle and comes to rest. All of these maneuvers must be completed before the beginning of the next exposure interval, during which the mirror must rotate at the desired rate after acceleration. The angular velocity of the mirror, therefore, is a discontinuous function, having intermittent periods of a desired velocity which reoccur prior to the beginning of each exposure interval and which have a duration of at least the exposure interval.

The desired magnitude of the angular velocity of the moving mirror is dependent upon vehicle speed and altitude, and the duration of the interval is dependent upon film exposure time. The actual magnitude of mirror velocity must be identical to the desired magnitude, to obtain a maximum amount of image motion compensation.

In the past, it has been a general practice in the measurement of actual rates to employ a suitably calibrated rate transducer mounted upon a moving device, in combination with an oscilloscope or a paper recorder in order to display the entire velocity profile exhibited by the moving device.

A major source of error that may be present results from a characteristic of rate gyros or other motion or velocity transducers in that the actual velocity information is mixed with random and/or cyclic noise.

The present invention may be utilized in combination with a motion transducer, for example a rate gyroscope. A moving device having an angular velocity, such as the rotating mirror of an image motion compensation system, may have a rate gyro attached thereto for test and calibration purposes. Where the moving device of an image motion compensation system exhibits a linear rather than angular velocity, the invention may be used in combination with a linear velocity transducer or tachometer, such as the conventional permanent magnet translated through a solenoid or the pulse rate electro-optical and electro-mechanical varieties.

When used in combination with a transducer, the present invention will provide a continuous signal representing an accurate comparison between the actual velocity and a desired velocity of a moving device during discrete, predetermined time intervals which correspond to film exposure intervals. Initially the invention can be calibrated against a velocity standard. The invention is characterized by the combination of:

(a) First means, adjustable to provide a reference signal calibrated to correspond to desired velocities of a moving device;

(b) Second means, adapted to receive the output signal from a rate transducer coupled to the moving device, for continuously providing a velocity signal representing the actual velocity of the moving device and having a component representing noise signals;

(c) Third means coupled to said first and second means for producing an error output signal including a noise representing component, corresponding to a deviation of the actual velocity from a selected desired velocity;

(d) Fourth means connected to said third means for sampling said error output signal during preselected discrete time intervals;

(e) Fifth means couped to said fourth means for generating, during each sampling interval, an accumulated average error signal representing the average error over a plurality of sampling intervals, and for storing between successive sampling intervals said accumulated averaged error signal, for providing at all times an accumulated averaged error signal; and (f) Sixth means coupled to said fifth means for displaying an indication of the magnitude and polarity of said accumulated averaged error signal.

Since the error signal is cumulatively averaged, the random and cyclic noise which is included in the velocity signal tends to disappear by being "averaged out." Furthermore, since the error signal is sampled only during those preselected, discrete time intervals which correspond to film exposure intervals, the accumulated averaged error signal does not represent the error in the entire velocity profile exhibited by the moving device, but only the "error" in velocity during the intervals of interest.

The storing of the accumulated averaged signal between sampling intervals, however, allows that signal to be "continuous" with respect to time, and the magnitude and polarity of the accumulated averaged error signal displayed by a suitable readout means represents a long term "average" of the velocity errors of the moving device during film exposure intervals, with respect to the desired velocity.

It is an object of the present invention, therefore, to provide apparatus for cumulatively averaging velocity error signals on a discontinuous basis with respect to time, and for effectively converting a discontinuous, noisy signal to a suitably filtered, highly accurate, "pseudo steady state" D.C. signal for presentation on a nonambiguous readout means.

It is a further object of the present invention to provide test apparatus that is to operate in conjunction with other apparatus which must function over a critical desired velocity range of a limited time interval and over other velocities during other times.

It is another object of the present invention to provide apparatus for accurately comparing actual velocity of a moving device, during repetitive discontinuous time intervals, with a desired velocity.

It is still another object of the present invention to provide apparatus which compensates for random and cyclic noise in a velocity signal for accurately measuring a velocity signal which corresponds to the error in actual velocity during selected intervals of a moving device with respect to a desired velocity.

It is yet a further object of the present invention to provide apparatus for accurately comprising actual velocity of an image motion compensation device, during film exposure intervals, with a desired velocity.

It is still a further object of the present invention to provide apparatus for simply and accurately testing an image motion compensation system.

The novel features which are believed to be characteristic of the invention together with further objects and advantages thereof will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

Figure 1:
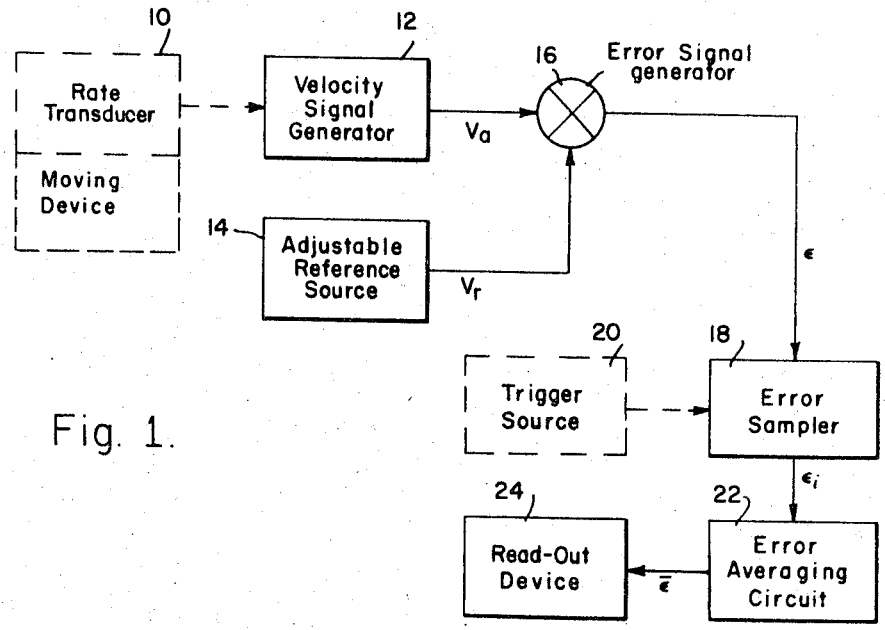
FIG. 1 is a block diagram of apparatus according to the present invention, in combination with a rate transducer and a trigger source.

The block diagram of FIG. 1 shows a transducer 10 with its output coupled to velocity signal generator 12 which presents the transducer output signal $V_r$ in a more convenient form for comparison with a reference signal from an adjustable reference source 14. When used in combination with a rotating mirror of an image motion compensation system, the rate transducer 10 may be a rate gyroscope connected to the mirror and which responds to the angular displacement of the mirror. The reference signal $V_r$ from the adjustable reference source 14 has been calibrated to correspond to various velocities of the mirror. A setting, representing a desired velocity, provides a corresponding signal. Accordingly, the difference ϵ between the signal representing desired velocity $V_r$ and the actual velocity signal $V_a$, as produced by error signal generating means 16, represents the error in the actual velocity of the mirror, $\epsilon = (V_r - V_a)$.

The error signal ϵ is sampled by an error sampler 18, only during discrete time intervals which, in a preferred embodiment correspond to film exposure intervals during which the image motion compensation system is operable. These intervals are triggered by a trigger source 20 which is connected to an appropriate activator such as the rate transducer, the camera web transfer mechanism, the camera shutter, or the moving mirror. Where other systems of image motion compensation are employed, the trigger source may be actuated by other means, such as the film platen of the camera, if moving-platen image motion compensation is employed.

The error signal ϵ is sampled during selected, discrete intervals, and the discontinuous error signal $\epsilon_1$ samples are cumulatively averaged by an error averaging circuit 22. Such averaging acts as a "filter" for random and cyclic noise which is normally included in the error signal, causing such noise to disappear by being "averaged out." The accumulated average signal $\overline{\epsilon}$ is stored between sampling intervals, and the output of the error averaging circuit 22 is a continuous signal $\overline{\epsilon}$ with respect to time, having a magnitude and polarity representing the average of the velocity errors during film exposure intervals. The magnitude and polarity of this accumulated averaged error signal $\overline{\epsilon}$ is displayed by a readout device 24.

Figure 2:
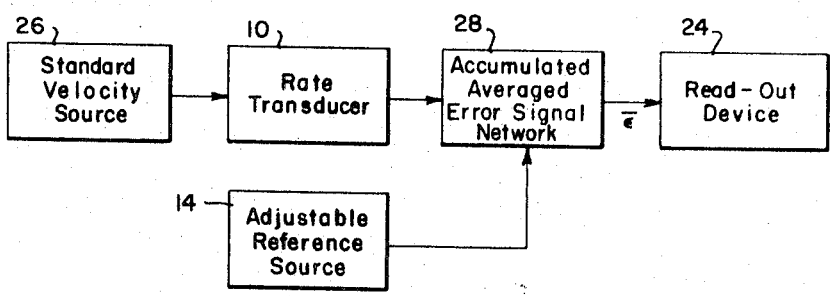
FIG. 2 is a block diagram of apparatus of the present invention connected to a standard source for calibrating the adjustable reference source.

Turning to FIG. 2, the reference signal which corresponds to a desired velocity may be established by calibrating the adjustable reference source 14. The rate transducer 10 may be connected to a standard velocity source 26 which provides a known and controlled velocity input. The output of the rate transducer 10 and the adjustable reference source 14 are appropriately connected to an accumulated averaged error signal network 28. The network 28 includes the error signal generator 16 and the error averaging circuit 22 of FIG. 1. The trigger source 20 is connected to lock the error sampler 18 into a continuous sampling condition. The adjustable reference source 14 is then adjusted until the accumulated averaged error signal $\overline{\epsilon}$ is zero, as indicated by a null reading on the readout device 24. This process is repeated for various known velocities, and each such velocity can be corresponded to a different setting of the reference source 14.

In operation, the standard velocity source 26 is replaced by a moving device whose velocity during discontinuous intervals is to be compared with a selected standard velocity. The magnitude and polarity of the accumulated averaged error signal $\overline{\epsilon}$ is indicated on the readout device 24. The actual velocity of the moving device may then be adjusted until a null reading is indicated on the readout device 24, indicating that the actual velocity $V_a$ of the moving device during the discontinuous intervals of interest is identical to the selected velocity.

The invention uses a known and controlled "standard" velocity signal to calibrate the reference source for later comparison with an unknown velocity signal, and therefore permits accurate velocity measurements.

Figure 3:
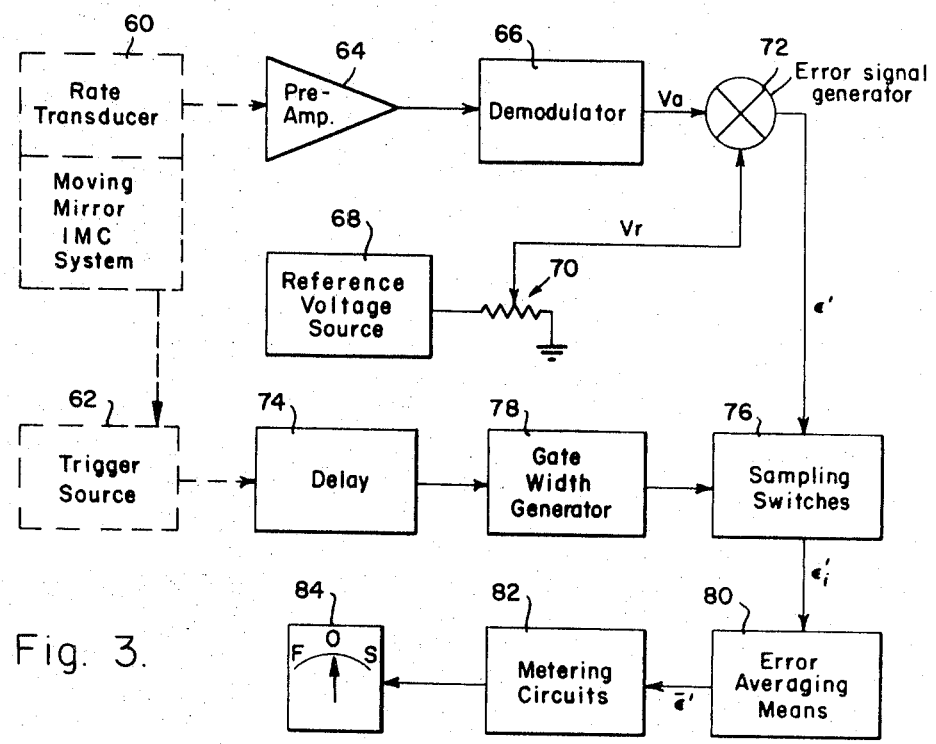
FIG. 3 is a block diagram of a preferred embodiment of the present invention, in combination with a rate transducer and a trigger source.

Turning next to FIG. 3, there is shown a preferred embodiment of the present invention. A rate transducer 60 and a trigger source 62 are shown in combination with a moving mirror image motion compensation system.

Connected to the mirror, is the rate transducer 60 such as a rate gyroscope, the output of which will be a voltage corresponding to mirror angular velocity. This velocity signal is amplified by a preamplifier 64 and is demodulated by a demodulator 66.

A reference signal is established by a reference voltage source 68 suitably adjusted to correspond to a desired velocity by means such as a potentiometer 70. The actual velocity signal $V_a$ and the desired velocity signal $V_r$ are applied to an error signal generator 72 which produces an error signal $\epsilon'$.

A trigger pulse, supplied by the trigger source 62 is delayed by a Delay 74, which may be a first monostable multivibrator or one-shot, in order to provide an actuating signal to sampling switches 76. The duration of the switching signal is established by a gate width generator 78 which may be a second monostable multivibrator or one-shot. The sampling interval is determined by operating characteristics of the second one-shot.

The sampling switches 76 apply the error signal $\epsilon_i'$, only during discrete intervals corresponding to the film exposure intervals of an associated camera, to an error averaging circuit 80. The samples are cumulatively averaged during successive sampling intervals, averaging out any random and cyclic noise which may be included in the error signal $\epsilon_i'$, and the accumulated averaged signal $\bar{\epsilon}'$ is stored between sampling intervals.

The output of the error averaging circuit 80 is connected at all times to a metering circuit 82, so that the signal $\bar{\epsilon}'$ seen by the metering circuit 82 is continuous with respect to time. A readout meter 84 is connected to the metering circuit 82 to display an indication of the magnitude and polarity of the accumulated averaged error signal $\bar{\epsilon}'$.

Figure 4:
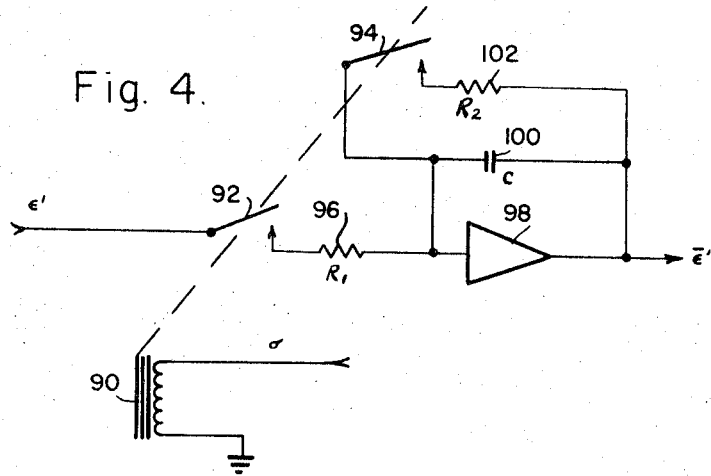
FIG. 4 is a diagram of a preferred embodiment of a sampling and averaging circuit according to the present invention.

In FIG. 4 there is shown a preferred embodiment of a sampling switch and error averaging circuit which samples and cumulatively averages the velocity error signal $\epsilon'$ to provide the accumulated averaged error signal $\bar{\epsilon}'$. A relay is provided which includes a solenoid 90, and a pair of normally open switches 92, 94. The solenoid 90 is energized by a signal $\sigma$ during sampling time to close the switches 92, 94, and deenergized between sampling times in order to open the switches 92, 94. The output $\epsilon'$ of the error signal generator is applied to one terminal of the normally open switch 92. The output of the switch 92 is connected to a first resistor $R_1$ 96, which is serially connected to the parallel combination of an operational amplifier 98, a capacitor 100, and a second resistor $R_2$ 102 in series with the normally open switch 94. The parallel combination is connected to provide the accumulated averaged error signal $\bar{\epsilon}'$.

During a sampling interval, the switches 92, 94 are closed and the amplifier output voltage is fed back through a feedback circuit which includes the parallel combination of the capacitor C 100 and the second resistor $R_2$ 102. After a sufficient number of samples, the capacitor C 100 becomes charged to a voltage corresponding to the average value of the error signal $\epsilon_i'$, and accordingly, the output signal $\bar{\epsilon}'$ from the amplifier responds to this average value.

Between sampling intervals, the switches 92, 94 are open, and the error signal $\epsilon'$ is ignored. The input signal to the amplifier 98 is then established by the voltage of the capacitor C 100. When the capacitor C 100 is in its normally charged condition, i.e. to a voltage corresponding to the average value of the error signal $\epsilon_i'$, the output signal $\bar{\epsilon}'$ from the amplifier responds to this average value. Thus, a continuous signal $\bar{\epsilon}'$ is produced at the output of the amplifier 98, corresponding to the average value of the error signal $\epsilon_i'$ during discontinuous times.

Figure 5:
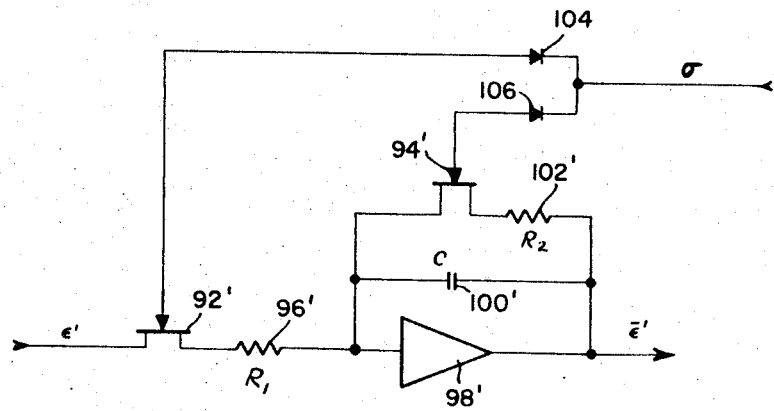
FIG. 5 is a diagram of an alternative sampling and averaging circuit utilizing a pair of FET switches.

Turning to FIG. 5, there is shown a first alternative embodiment of a circuit for sampling and cumulatively averaging the velocity error signal $\bar{\epsilon}'$. Primed reference numbers are applied to components similar to those of FIG. 3. A delayed and gated switching signal $\sigma$ is applied to each of the cathodes of two isolating diodes 104, 106. The anode of the diode 104 is connected to the gate of a first field effect transistor 92' and the anode of the diode 106 is connected to the gate of a second field effect transistor 94'. The function of these field effect transistors 92', 94' within the circuit of FIG. 5, is the same as the positions of the switches 92, 94, respectively, in the circuit of FIG. 4. The function of the function of the field effect transistors 92', 94' provide electronic switches for the sampling procedure, which are capable of sub-microsecond switching speed. Operation of the circuit of FIG. 5 is otherwise identical to that of FIG. 4.

Figure 6:
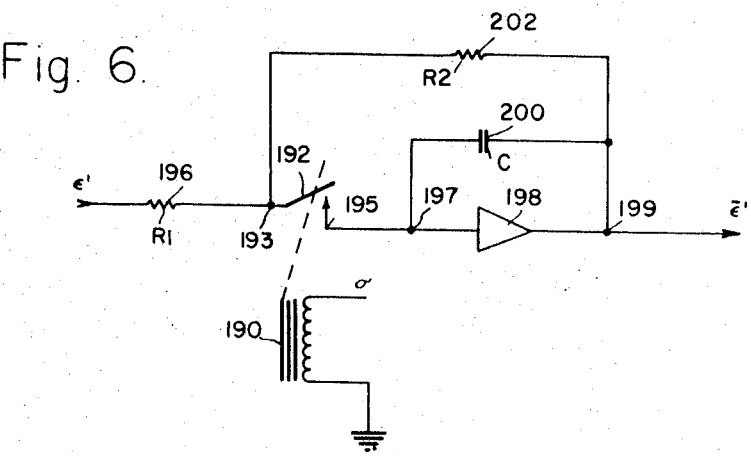
FIG. 6 is a diagram of yet another sampling and averaging circuit utilizing a relay switch.

In FIG. 6, there is shown a second alternative embodiment of a sampling switch and an error averaging circuit. A relay is provided, which includes a solenoid 190, and a normally open switch 192. The solenoid 192 is energized during sampling times to close the switch 192, and deenergize between sampling times in order to open the switch 192.

The switch 192 has an input side 193 and an output side 195. The output signal $\epsilon'$ of the error signal generator is applied through a first resistor $R_1$ 196, to the input side 193 of the switch 192. An operational amplifier 198, having an input terminal 197 and an output terminal 199 is provided, the input terminal 197 being connected to the output side 195 of the switch 192. A capacitor C 200 is shunt connected across the input and output terminals of the amplifier 198, and a second resistor $R_2$ 202 is shunt connected across the input side 193 of the switch 192 and the output terminal 199 of the amplifier 198.

During a sampling interval, the switch 192 is closed and the amplifier output voltage is fed back through a feedback circuit which includes the parallel combination of the capacitor C 200 and the second resistor $R_2$ 202. After a sufficient number of sampling times, the capacitor C 200 becomes charged to a voltage corresponding to the average value of the error signal $\epsilon_i'$, and accordingly, the output signal $\bar{\epsilon}'$ from the amplifier responds to this average value.

Between sampling intervals, the switch 192 is opened. The error signal $\epsilon'$ is effectively ignored, since the amplifier 198 acts as a zero impedance source. The input signal to the amplifier 198 is then established by the voltage of the capacitor C 200. When the capacitor is in its normally charged condition, i.e., to a voltage corresponding to the average value of the error signal $\epsilon_i'$, the output signal $\bar{\epsilon}$ from the amplifier responds to this average value. Thus, a continuous signal $\bar{\epsilon}'$ is produced at the output of the amplifier 198, corresponding to the average value of the error signal $\epsilon_i'$ during discontinuous times.

Figure 7:
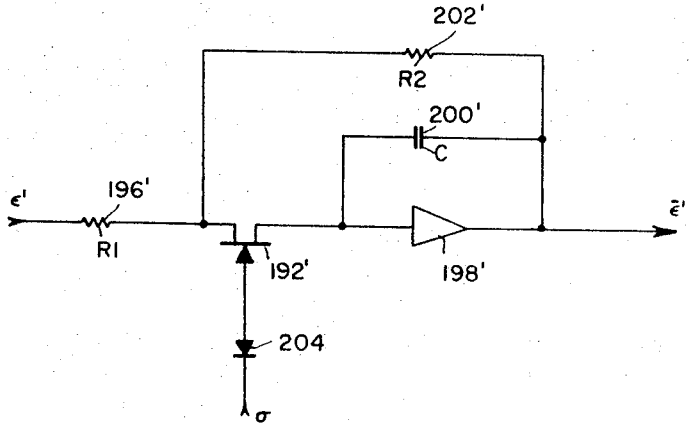
FIG. 7 is a diagram of yet another alternative sampling and averaging circuit employing a single FET switch.

Turning now to FIG. 7, there is shown a third alternative embodiment of a sampling and averaging circuit. Primed reference numbers are applied to components similar to those of the second alternative embodiment of FIG. 6. A delayed and gated switching signal $\sigma$ is connected to the cathode of an isolating diode 204, while the anode of the diode is connected to the gate of a field effect transistor 192'. The position of the field of effect transistor 192' within the circuit of FIG. 7, is the same as the position of the switch 192 in the circuit of FIG. 6. The field effect transistor 192' provides an electronic switch for the sampling procedure. Operation of the circuit of FIG. 7 is otherwise identical to that of FIG. 6.

It is noted that, in addition to the "averaging out of signal noise by the sampling process, the presence of feedback helps to reduce the signal noise.

Furthermore, the invention can be controlled so that transient disturbances, unrelated to velocity changes, will not affect the accumulated averaged error signal $\bar{\epsilon}'$. The charge on the capacitor C is cumulative and the total charge will change with a change in signal $\epsilon_1'$. However, the values of the resistor $R_2$ and the capacitor C can be adjusted so that the capacitor charge changes slowly over a large number of sample times, as determined by the averaging time $R_2$ C. Transient disturbances will therefore have little effect upon the accumulated averaged error signal $\bar{\epsilon}'$, while a long term disturbance, e.g. a change in velocity, will cause the signal $\bar{\epsilon}'$ to steadily change.

Thus there has been shown in several embodiments apparatus for detecting and signaling the deviation of the actual velocity of a moving device from a desired velocity during discrete, predetermined time intervals. The apparatus has particular significance as applied to image motion compensation systems in aerial cameras to insure accurate compensation for image motion.

Other embodiments of the present invention and modifications of the embodiments herein presented may be developed without departing from the essential characteristics thereof. For example, although the switching circuits disclosed herein include electro-mechanical devices and field effect transistors, other switching devices, such as those utilizing other types of transistors, silicon controlled rectifiers, thyratrons and similar devices having controllable conductive states, may be included within the scope of the invention.

Accordingly, the invention should be limited only by the scope of the claims appended below.

What is claimed as new is:

1. In combination with a rate transducer coupled to a moving device cyclically operable in a plurality of modes, each at a different velocity for signalling the actual velocity thereof, apparatus to compare the actual velocity of the moving device during discrete, predetermined time intervals, corresponding to individual ones of the modes with a desired velocity for the mode, comprising the combination of:
   (a) first means, adjustable to provide a reference signal that has been calibrated to correspond to desired velocities of the moving device;
   (b) second means, adapted to receive a signal from the rate transducer, for continuously providing a velocity signal representing the actual velocity of the moving device;
   (c) third means coupled to said first and second means for producing an error signal corresponding to a deviation of the actual velocity from a selected, desired velocity;
   (d) fourth means connected to said third means for sampling said error output signal during preselected, discrete time intervals corresponding to a selected mode;
   (e) fifth means coupled to said fourth means for generating, during each sampling interval an accumulated averaged error signal representing the average error in the selected mode over a plurality of sampling intervals and for storing, between successive sampling intervals said accumulated averaged error signal for providing at all times an accumulated averaged error signal corresponding to the selected mode; and
   (f) sixth means coupled to fifth means for displaying an indication of the magnitude and polarity of said accumulated averaged error signal; whereby the magnitude and polarity of said accumulated averaged error signal represents the average of the velocity errors corresponding to the selected mode, during a plurality of successive, discrete time intervals, each sampling during the selected mode, with respect to the desired velocity for the selected mode.

2. The apparatus of claim 1, above, wherein said fifth means include: amplification means having an input and an output terminal; capacitor means shunt connected to said input and output terminals; and resistor means shunt connected to said input and output terminals.

3. The apparatus of claim 2, above, wherein said fourth means include: a first switch, series coupled to said third means and said fifth means; a second switch series coupled to said resistor means, said series coupled second switch and resistor means being shunt coupled to said input and output terminals of said amplification means; and including means for closing both of said switches during each of said sampling intervals and for opening both of said switches between said sampling intervals.

4. The apparatus of claim 2, above, wherein said fourth means include: a first device having electrically conductive and nonconductive states, series connected to said third means and said fifth means; a second device having electrically conductive and non-conductive states series connected to said resistor means, said series connected second device and resistor means being shunt connected to said input and output terminals of said amplification means; and including means connected to said first and second devices for causing both of said first and second devices to be electrically conductive during each of said sampling intervals and electrically non-conductive between said sampling intervals.

5. The apparatus of claim 4, above, wherein each of said first and second devices includes a field effect transistor.

6. The apparatus of claim 1, above, wherein said fourth means include: switching means including a switch having an input side and an output side, and actuating means for closing said switch during each of said sampling intervals and for opening said switch between sampling intervals; and said fifth means include amplification means having an input terminal and an output terminal, said input terminal being connected to said switch output, a capacitor shunt connected across said input and output terminals of said amplifier means, and a resistor shunt connected across said input side of said switch and said amplifier output terminal.

7. The appaaratus of claim 6, above, wherein said switching means switch comprises a device having electrically conductive and non-conductive states, further including means connected to said device for causing said device to be electrically conductive during each of said sampling intervals and electrically non-conductive between said sampling intervals.

8. The apparatus of claim 7, above, wherein said device is a field effect transistor.

9. In combination with a rate transducer coupled to a moving element in a camera image motion compensation apparatus cyclically operable in a plurality of modes, each at a different velocity for signalling the actual velocity of the element at all times, apparatus to compare the actual velocity of the moving element during discrete, predetermined time intervals corresponding to a selected operating mode, with a desired velocity for that mode, comprising the combination of:
   (a) reference means, adjustable to provide a reference signal, calibrated to represent desired velocities of the moving element of the image motion compensation apparatus;
   (b) comparing means connected to the rate transducer and to said reference means for producing an error signal corresponding to and representative of a deviation of the actual velocity of the moving element from a selected, desired velocity represented by the output of said first means;
   (c) sampling and holding means connected to said reference means for sampling said error signal for a pre-selected, discrete time interval during the selected operating mode and for accumulating and averaging said error signal samples to provide an accumulated averaged error signal representing velocity deviation in the selected operating mode; and
   (d) display means coupled to said sampling and holding means and operable in response to said accumulated averaged error signal for displaying and indicating the polarity and magnitude of said accumulated averaged error signal.

10. Apparatus according to claim 9, further including triggering means coupled to the camera and to said sampling and holding means and responsive to shutter operating signals for applying energizing signals to said sampling and holding means to select a discrete time interval within a picture taking interval whereby errors in the velocity of the moving element, during the picture taking interval can be determined.

11. Apparatus according to claim 10, above, wherein the moving element is a moving mirror.

12. Apparatus according to claim 10, above, wherein the moving element is a moving platen.

References Cited

UNITED STATES PATENTS

| | | | |
|---|---|---|---|
| 2,905,876 | 9/1959 | Hillman | 235—183 |
| 3,182,503 | 5/1965 | Corcoran | 235—183 |

RUDOLPH V. ROLINEC, Primary Examiner

MICHAEL J. LYNCH, Assistant Examiner

U.S. Cl. X.R.

324—69